Nov. 11, 1924.

A. E. MELCHIOR

BATTERY

Filed June 19, 1922    4 Sheets-Sheet 1

1,514,670

Witness:
Jas E Hutchinson

Inventor:
August E. Melchior
By Milans & Milans
Attorneys

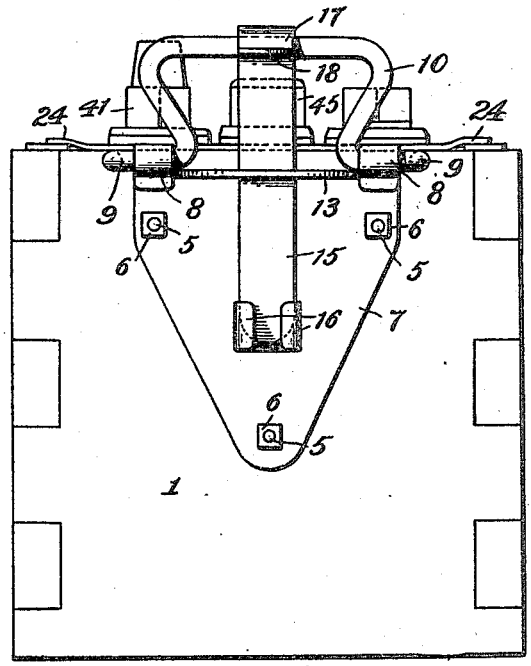
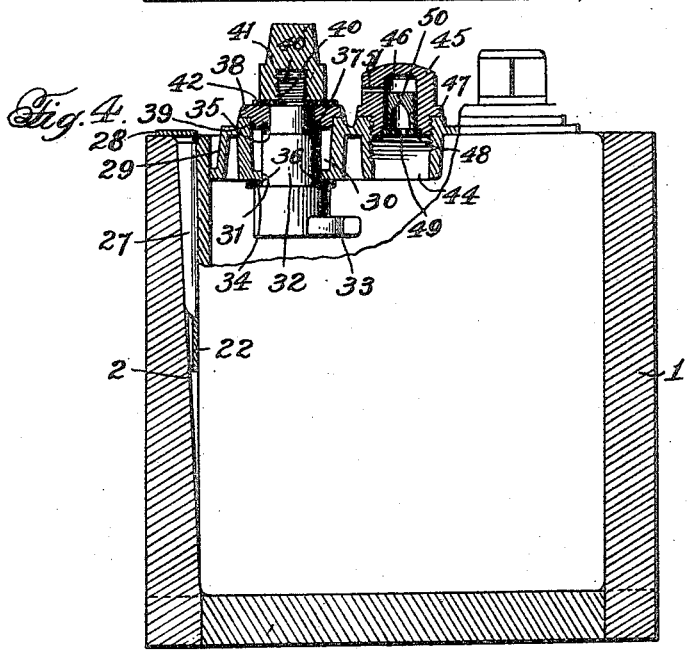

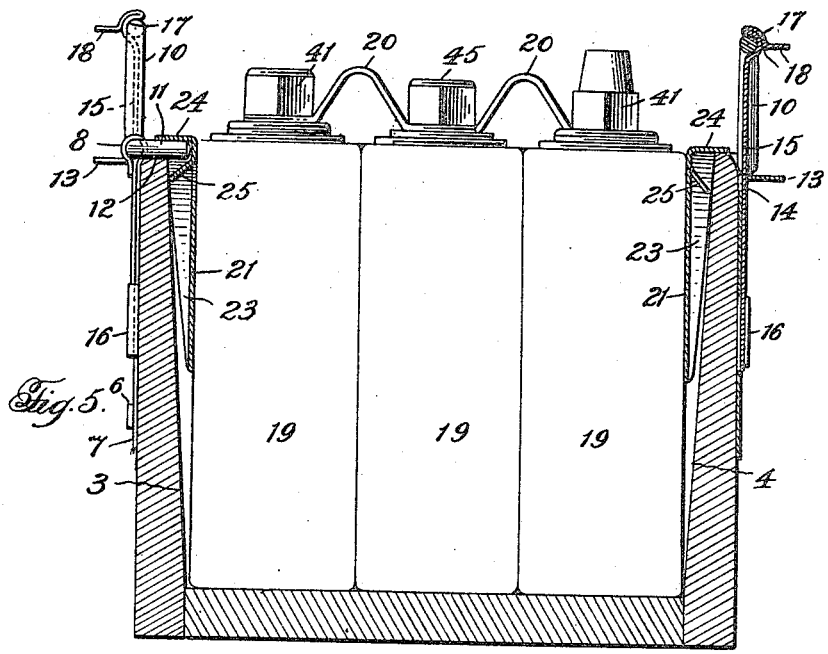
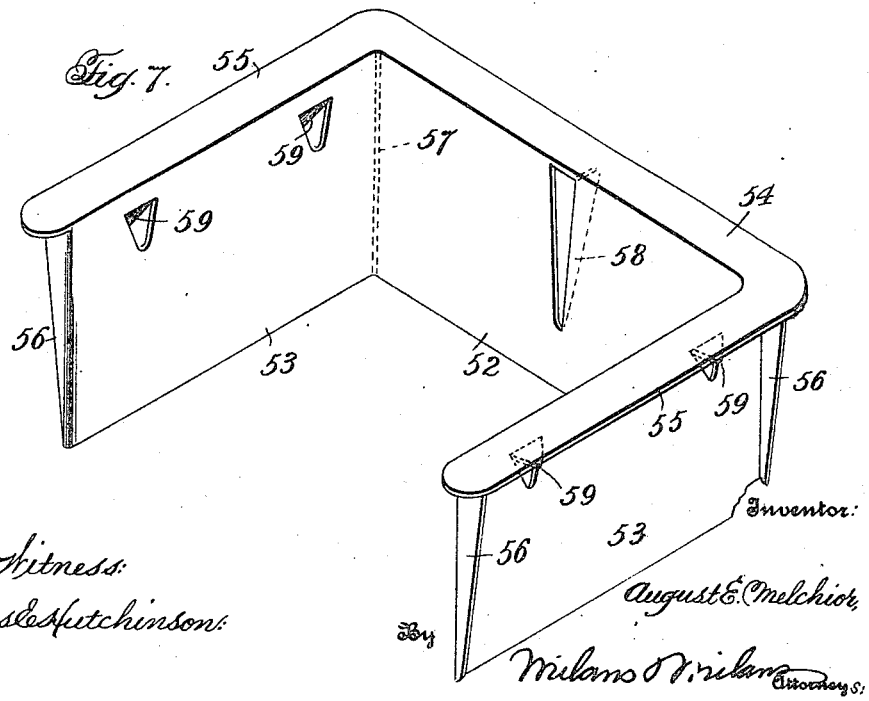

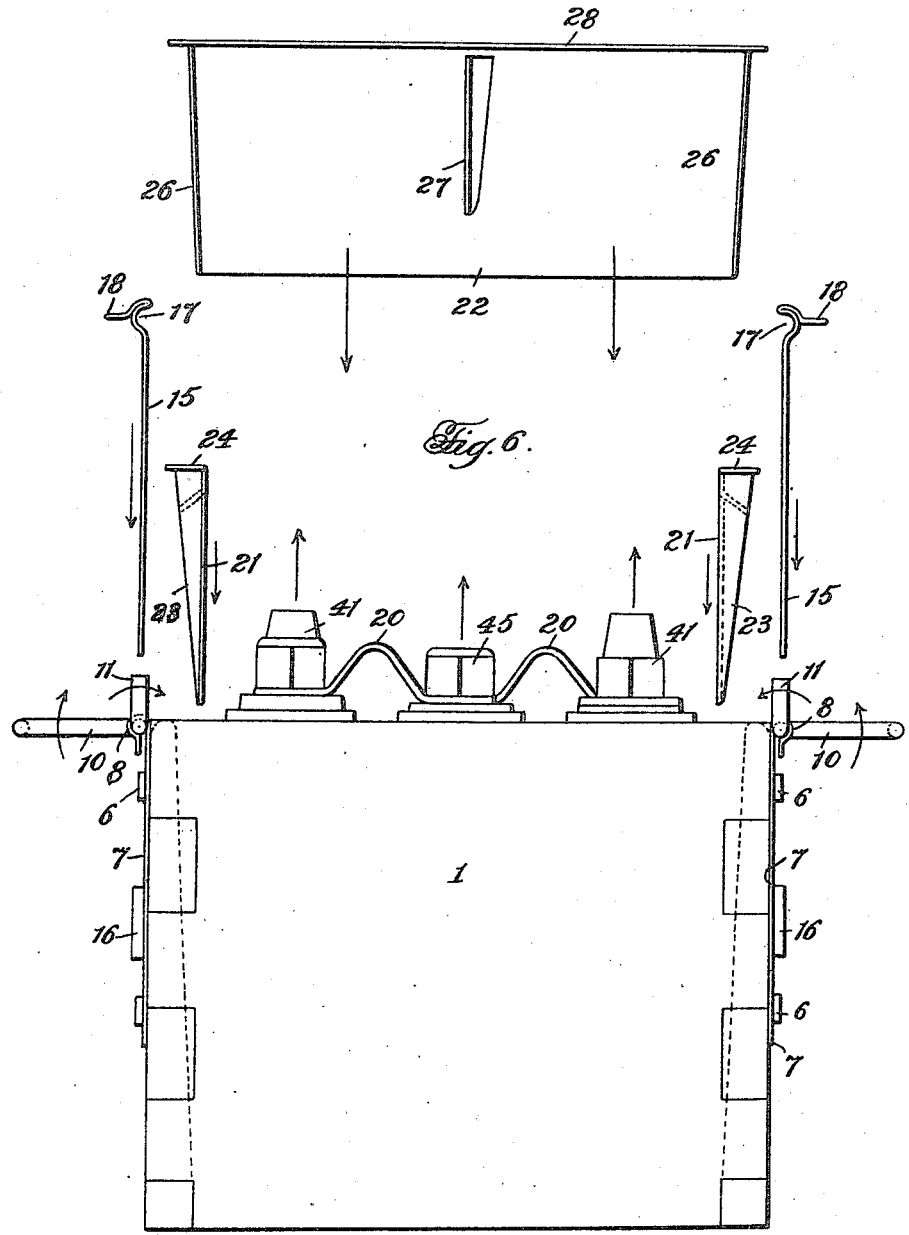

Patented Nov. 11, 1924.

1,514,670

UNITED STATES PATENT OFFICE.

AUGUST E. MELCHIOR, OF OAKDALE, LOUISIANA, ASSIGNOR OF ONE-HALF TO JOHN G. JONES, OF OAKDALE, LOUISIANA.

BATTERY.

Application filed June 19, 1922. Serial No. 569,386.

*To all whom it may concern:*

Be it known that I, AUGUST E. MELCHIOR, a citizen of the United States, residing at Oakdale, in the parish of Allen and State of Louisiana, have invented certain new and useful Improvements in Batteries, of which the following is a specification, reference being had therein to the accompanying drawing.

Storage batteries as now commonly used in automobiles or other vehicles are so constructed that when it is desired to recharge, repair, or test for various purposes, it is necessary to remove the entire battery box from the automobile or other vehicle and if it is necessary to gain access to the individual cells of the battery it is necessary to remove the sealing material or cover, which is placed over the cells, this being done by melting the sealing or in other desired manners.

The ordinary driver of an automobile or other vehicle knows very little about the construction and general operation of his battery and with those batteries now commonly in use if the battery goes dead it is necessary to go to a service station or battery expert to ascertain what the trouble might be. This involves the owner or operator of the car in considerable expense and, as above stated, it is necessary to remove the entire battery box and break the seal which covers the individual cells. After the battery has then been repaired it is again necessary to apply the sealing cover and return the entire battery box to its place in the vehicle. After going to all of this trouble it is usually found that a new battery is necessary thus involving the owner or driver of the vehicle in that additional expense.

In order to overcome the difficulties above enumerated, and others which will be readily apparent, it is the object of my invention to provide a storage battery which is readily accessible to the driver of the vehicle and which has interchangeable units so that if one unit goes dead it may be readily replaced and the parts are so positioned that the cells may be removed from the battery box without removing the box from the vehicle and the driver of the vehicle himself may ascertain by testing which of the units is causing the trouble or has gone dead.

In carrying out the above object there is no sealing cover over the individual cells making up the battery but the same may be easily removed from the battery box.

A further object of the invention resides in the provision of novel means for securing the units or cells within the battery box so that they may not move relative to the box, said securing means being readily removable by the operation of the handles by which the entire battery is carried from place to place.

A further object resides in providing non-leakable binding posts and filler caps, said filler caps being so constructed that gases which may accumulate in the cells may pass off but the liquid will be returned into the cells.

While my battery is constructed primarily for use of a fluid which itself will charge the plates it will be understood that if desired the cells might be charged from a line in the usual manner.

With the above and other objects in view, which will appear as the description proceeds, my invention consists in the novel details of construction and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 3 is an end view.

Fig. 4 is a transverse vertical section through the battery box and a portion of one of the cells with parts shown in elevation.

Fig. 5 is a longitudinal vertical section through the battery box and securing wedges with the battery cells shown in end elevation.

Fig. 6 is a side elevation showing the positions of the securing wedges and other securing elements ready to be placed in position, and Fig. 7 is a detail perspective showing a modified form of securing wedge.

Figure 1:
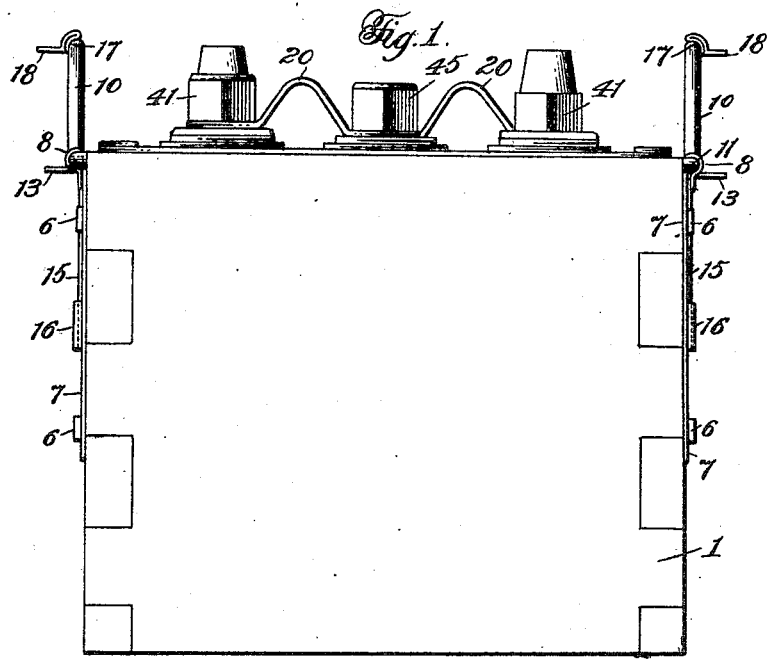
Fig. 1 is a side elevation.
Figure 2:
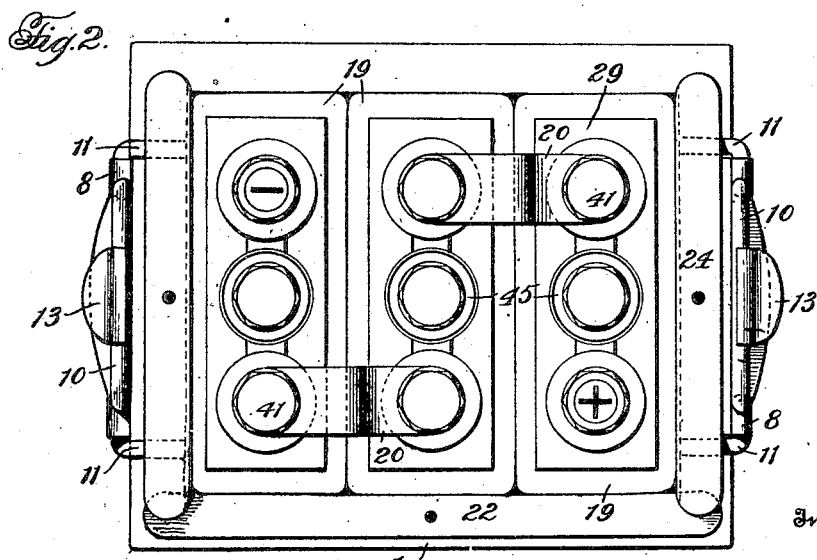
Fig. 2 is a top plan.

In the drawings 1 indicates the battery box which may be of wood, hard rubber or similar material, said box having one of its side walls interiorly beveled as shown at 2 and its end walls interiorly beveled as shown at 3 and 4. Secured to each end of the box by means of the screws 5 and nuts 6 is a plate 7 which has formed on its upper edge, preferably by bending, the transversely spaced eyes 8, the bores of which extend longitudinally to receive the horizontal extensions 9 of the handle 10, the horizontal extensions having the right angle projections 11 which are normally received in notches or recesses 12 formed in the upper edges of the ends of the box. It will be readily understood that the horizontal portions 9 are loosely received in the eyes 8 so that the handles 10 may be swung into vertical or horizontal position as desired. The right angle projections 11 are of such a length as to extend beyond the inner faces of the ends of the box, as more particularly illustrated in Fig. 5 of the drawings, for a purpose which will be later set forth. The upper edge of the plates 7, intermediate the eyes 8, are bent to form the right angle flanges 13 which have intermediate their ends an opening 14 through which may extend the metal strips 15, the lower ends of which are adapted to be received in and between the ears or lugs 16 which are struck from the plates. The upper ends of the strips 15 are bent to form the semi-circular socket 17 and the outwardly extending projection or finger hold 18, the semi-circular sockets or recesses 17 receiving the top horizontal portions of the handles 10 when said handles are swung in vertical position as more clearly illustrated in Figs. 1, 2, 3 and 5 of the drawings.

Received in the box 1 are a plurality of cells or jars 19 these cells or jars being of hard rubber and adapted to be held in the box without the use of a sealing cover. The cells or jars each form a separate and distinct unit and may be removed from the box as a whole or each may be separately removed, without removing the box itself from its position in the vehicle. The adjacent cells or jars are connected in the usual manner by means of the connectors 20 which are preferably in the form of strips of copper or similar material covered with lead, these connectors being secured to the cells or jars in a manner which will be later described. The cells or jars are secured or held in the box by means of the end wedges 21 and side wedge 22, these wedges cooperating with the beveled side 2 and beveled ends 3 and 4 of the box to hold the cells against jarring or other movements. Both the end wedges 21 and the side wedge 22 are preferably formed of hard rubber although at times it may be found desirable to construct them of other material, it being understood that such material will necessarily have to be used as will not be affected by the fluids used in the battery. The end wedges 21 are formed with the beveled end flanges 23 and the top flange 24 which overlies the upper ends of the end flanges 23 and project slightly beyond the said end flanges to form finger holds or projections whereby the wedges may be lifted. The beveled end flanges 23 project outwardly so as to engage the beveled end faces of the box. Struck from the end wedges, intermediate the end flanges, and preferably just beneath the top flange, are the longitudinally spaced inclined lugs or projections 25, more particularly shown in Figs. 5 and 6. These lugs or projections are adapted to be engaged by the inner ends of the projections 11 on the handles 10 so that when the handles are being raised to vertical positions the wedges will be forced downwardly into securing position. When it is desired to remove the wedges the handles will be swung into horizontal position thereby causing the projections 11 to engage the top flange 24 and raise the wedge. The side wedge 22 is formed with the outwardly extending beveled end flanges 26 and an intermediate beveled flange 27, this intermediate beveled flange 27 being struck from the wedge as more particularly shown in Fig. 6 of the drawings. An outwardly extending flange 28 is formed on the upper edge of the wedge, overlies the top of the end and intermediate flanges, and projects slightly beyond the said end flanges to form finger holds for lifting the wedges when desired. This side wedge 22 is placed between the beveled side of the box and the adjacent ends of the cells or jars so that the beveled flanges 26 and 27 will engage the beveled surface 2 of the side. When this side wedge is in position the cells or jars 19 will be forced into tight engagement with the straight side of the box and the upper flange 28 of the wedge will overlie the side of the box whereas the ends of the top flange will overlie the ends of the box as more clearly shown in Fig. 2 of the drawings. It will be understood that when positioning the side and end wedges the side wedge will be first placed in position and then the end wedges will be placed in position one end of the top flange of each end wedge overlying the side wedge and the opposite end thereof overlying the opposite side of the box. The top flanges 24 of the end wedges, when in position, will also overlie the ends of the box. It is thought that a clear understanding of the position of the several wedges will be clearly understood by reference to Fig. 2 of the drawings. The wedges hold the cells very tightly and prevent them jarring or moving with relation to the receiving box 1.

As previously stated the cells or jars 19 are preferably of hard rubber and each individual cell or jar is provided with a cover 29 of similar material said covers being secured in the jars or cells in any of the well known manners. These covers 29 are provided with depressions 30 having openings 31 in the bottom thereof to receive the binding posts 32 of the plate supports 33. These binding posts are formed with the shoulders 34 and 35 which form seats for the washers 36 and 37 respectively, the washer 36 engaging the underside of the cover, as quite clearly shown in Fig. 4 of the drawings, and the washer 37 engaging the underside of the cap 38 which has an extension 39 received in the recess 30 and a recess 40 to receive the washer 37. The upper ends of the binding post 32 are threaded as shown at 40 to receive the nuts 41 said nuts, when screwed in position, forcing the cap 38 securely in position and making a tight fit between the cover and the binding post connections. A washer 42 is received on the top of the cap 38 and is engaged by the under surface of the nut 40. The end cells or jars have one of their securing nuts 41 carrying or formed with the tapered terminal connection 33 to receive the terminals of the connecting wires. As the terminals of the connecting wires form no part of the present invention a detailed illustration thereof or description has not been thought necessary. A sealing compound may be placed in the recess 30 around the binding post and thereby aid in making a non-leakable joint between the cover 29 and the binding post connections.

Each of the covers 29 is provided with a central filling opening 44 adapted to be closed by a cap 45 having a recess 46 extending from the bottom thereof. The filling opening 44 is interiorly threaded and the cap 45 exteriorly threaded as shown more particularly in Fig. 4 of the drawings, and the cap is provided with an outwardly extending flange 47 adapted to overlie the filling opening as shown. The bottom of the cap 45 is formed with a seat to receive a plate or disc 48, of rubber or similar material, said plate or disc having an opening 49 to the recess 46. An inverted cup shaped valve 50 is received in the recess 46 and normally overlies the opening 49. The cap 45 has a transversely extending opening 51, above the disc or plate 48, and when gases accumulate in the cell the pressure thereof will raise the cup shaped valve 50 off of the disc or plate 48 and allow the gases to pass through the openings 49 and 51. The liquid will be prevented from passing out as the valve will be reseated just as soon as the gas pressure is reduced. This valve 50 is also preferably of rubber, or similar material, so as it will not be affected by the fluids of the battery.

In Fig. 7, of the drawings, I have illustrated a slightly modified form of wedge construction. In this form of the invention the end wedges and the side wedge are formed as a unitary structure and not as separate members as previously described. In this form the side portion of the wedge is indicated at 52 and the end portions at 53, the side portion being formed with the outwardly extending horizontal flange 54 and the end portions with the outwardly extending horizontal flange 55. The end portions are provided with the beveled end flanges 56 whereas the side portion has the outwardly extending beveled end flanges 57 and the intermediate beveled flange 58 which is struck from the side in the same manner as described for the preferred form of side wedge. The end portions are also provided with the outwardly extending lugs or projections 59, these projections being struck from the end portions as shown and adapted to be engaged by the projections 11 of the handles 10, in the manner previously described, so that the wedge may be forced into tight engaging position upon the raising of the handles into their normal vertical position. At times it might be found desirable to construct the wedge as disclosed in this modified form although I believe that it will be preferable to form the wedge in the individual pieces as described for the preferred embodiments.

From the above detailed description it is thought that the construction and operation will be clearly understood, but I wish to call attention and to lay particular stress upon several of the details and advantages. My battery is so constructed that when there is any trouble therewith it will not be necessary to remove the entire battery, including the box, from the automobile or other vehicle, but instead the individual units which may be causing the trouble may be removed, repaired, and replaced, or new units or individual sections may be applied. As I have previously stated those batteries which are upon the market are formed with a sealing cover, or in other words a sealing compound which hardens and holds the cells within the battery box or as a unit therewith, and when there is any trouble with the battery it is necessary to remove the same as an entirety thereby causing considerable labor, and the seal must be broken to gain access to the individual cells. With my construction the box remains in the vehicle at all times and the cells as a unit may be removed or the connection between adjacent cells may be removed and the individual cells taken from the box. When there is trouble with the battery any one, although not familiar with battery constructions, may test the individual cells by applying a suitable instrument to the positive and negative polls thereof and when it is ascertained in just which cell the trouble lies or which cell has discharged and is not working this individual cell may be removed and repaired and then replaced or an entirely new cell may be introduced into position. This does away with the usual expense of an entirely new battery or as previously described the expense of labor required in taking the battery from the machine, unsealing, and then ascertaining just what particular cell is causing the trouble. The units in the form of the individual cells may be kept at service stations and the driver may very easily purchase them and have them positioned in the battery box with little expense. I have described the idividual cells as containing a fluid for charging the plates although I wish it understood that, if found desirable, the plates might be charged on a line as is now the usual custom. The fluid may be of any desired solution and may be supplied to the cells through the filling openings 44 by merely removing the closing caps 45. The wedges tightly hold the cells within the battery box and will normally be in the positions indicated in Figs. 1, 2, 3, 4, and 5 of the drawings. When it is desired to remove one or all of the cells the strips 15 are sprung so that the upper curved end portions thereof will be disengaged from the handles 10 and then the strips may be raised vertical from connection with the plates 7. When the strips 15 have been removed then the handles 10 may be swung downwardly into horizontal position, this swinging movement causing the projections 11 of the handle 10 to engage beneath the upper flanges 24 of the end wedges and raise them slightly above the top of the box. When thus raised the wedges may be lifted by engaging the end extensions of the upper flange. After the end wedges have been removed then the side wedge 22 may be lifted from position by engaging the end extensions of the upper flange thereof. After both the end and side wedges have been lifted from position then the connected cells may be removed from the box or if desired connection between adjacent cells may be broken and the individual cells raised from position in the box. When the cells have been repaired or recharged then they are again placed in the box with one of their ends adjacent the straight wall of the box. The side wedge 22 is then dropped into position and forces the cells tightly against the straight side wall. The end wedges are then dropped in position and upon swinging the handles 10 upwardly into normal vertical position the projections 11 will engage the lugs or ears 25 of said end wedges and force them downwardly into tight engagement with the cells. The cells are thus held securely in the box and the handles are again secured in their vertical positions by reinserting the strip 15 so that the upper horizontal portions of the handles will be received in the semi-circular sockets 17 thereof.

The filling cap 45, as previously described, carries a valve whereby the gases which may accumulate in the cells may be discharged. At the same time the filling cap and valve will prevent the liquids from passing out to damage the exterior connections of the cells. The binding posts are also connected to the covers of the cells in a novel manner and receive packing washers so that any leakage around the binding posts is prevented. I have thus provided a novel form of battery made up of a plurality of interchangeable units provision also being made to prevent the liquid within the cells from splashing out around the binding posts or through the filling cap, this preventing said fluid or liquid from corroding or otherwise damaging the parts.

In using the modified form of wedge as illustrated in Fig. 7 the operation will be just the same as that previously described although it will be understood that in removing or replacing the side and end wedges will be moved as a unit. Where the side and end wedges are separate and distinct pieces the end wedges will overlie the upper surface of the side wedge thereby acting as a lock therefor.

Having fully described my invention what I claim as new and desire to secure by Letters Patent is:

1. A battery comprising a container, cells received in the container, means insertible between the container and cells for holding the cells against movement within the container, and means carried part by the cell holding means and part by the container for operating the holding means.

2. A battery including a container, cells received in the container, and means interposed between the ends of the container and cells, and one side of the container and cells, for securing the cells in the container.

3. A battery comprising a container, cells received in the container, and wedges interposed between the ends of the container and the cells and the side of the container and the cells for securing the cells within the container.

4. A battery comprising a container, cells received in the container, and wedges interposed between the container and cells, the ends of said wedges overlapping.

5. A battery comprising a container, cells received in the container, a side wedge interposed between the container and cells, and end wedges interposed between the container and cells, said end wedges overlapping the side wedge.

6. A battery comprising a container, cells received in the container, and wedges interposed between the container and cells, said wedges having top flanges adapted to overlie the edges of the container.

7. A battery comprising a container having interiorly beveled walls, cells received in the container, and means cooperating with the beveled walls of the container for securing the cells therein.

8. A battery comprising a container having interiorly beveled walls, cells received in the container, and wedges adapted to be inserted between the container and cells, and cooperating with the beveled walls of the container, for securing the cells therein.

9. A battery comprising a container, cells adapted to be received in the container, and plates adapted to be received between the container and cells, said plates having beveled flanges for engaging the walls of the container.

10. A battery comprising a container having interiorly beveled walls, cells adapted to be received in the container, and plates adapted for insertion between the container and cells, said plates having beveled flanges adapted to cooperate with the walls of the container for securely holding the cells within the container.

11. A battery comprising a container, cells received in the container, means inserted between the container and cells for securing the cells within the container, and means carried by the container for operating the securing means.

12. A battery comprising a container, cells received in the container, wedges insertible between the container and cells, and means carried by the container and engaging the wedges, for raising them with respect to the container and cells.

13. A battery comprising a container, cells carried by the container, wedges insertible between the container and cells, and means carried by the container, and engaging the wedges, for lowering them with respect to the container and cells.

14. A battery comprising a container, cells received in the container, wedges insertible between the container and cells, and means carried by the container and engaging the wedges for raising and lowering them with respect to the container and cells.

15. A battery comprising a container, cells received in the container, wedges insertible between the container and cells, and means pivotally connected to the container for raising and lowering the wedges with respect to the container and cells.

16. A battery comprising a container, cells received in the container, wedges insertible between the container and cells, and handles pivotally connected to the container and engageable with the wedges for operating them with respect to the container and cells.

17. A battery comprising a container, cells received in the container, wedges insertible between the container and cells, handles pivotally connected to the container, and projections on the handles and engaging the wedges, to operate the wedges upon movement of the handles, with respect to the container and cells.

18. A battery comprising a container, cells within the container, wedges insertable between the container and cells, a handle pivotally connected to the container, and projections on the handle, said projections overlying the container, and engaging the wedges, for operating the wedges with respect to the container and cells upon movement of the handle.

19. A battery comprising a container, cells received in the container, a wedge insertable between the container and cells, said wedge having a flange adapted to overlie the top of the container, and a member carried by the container and engageable beneath the flange of the wedge whereby the wedge may be raised with respect to the container and cells upon operation of the member carried by the container.

20. A battery comprising a container, cells received in the container, a wedge insertable between the container and cells, said wedge having a flange adapted to overlie the container, a handle pivotally connected to the container, and a projection on the handle and engageable beneath the flange of the wedge for operating the wedge upon movement of the handle.

21. A battery comprising a container, cells received in the container, a wedge insertable between the container and cells, said wedge having a flange adapted to overlie the container and a projection beneath the flange, a handle pivotally connected to the container, and a projection on the handle and engageable with the flange and projection of the wedge for operating the wedge, upon movement of the handle, with respect to the container and cells.

22. A battery comprising a container, cells received in the container, a wedge insertable between the container and cells, said wedge having a flange on its upper edge and a projection beneath the flange, a handle pivotally connected to the container for swinging movement, and a projection on the handle for engaging the projection of the wedge, when the handle is raised into vertical position, to move the wedge downwardly and to engage beneath the flange of the wedge, when the handle is moved into horizontal position, to raise the wedge.

23. A battery comprising a container, cells received in the container, a wedge insertable between the container and cells, a handle pivotally connected to the container and adapted to operate the wedge, and means for normally holding the handle in vertical position.

24. A battery comprising a container, cells received in the container, a wedge insertable between the container and cells, a handle pivotally connected to the container and adapted to operate the wedge, and removable means for normally holding the handle in vertical position.

25. A battery comprising a container, cells received in the container, a wedge insertable between the container and cells, a handle connected to the container for swinging movement and adapted to operate the wedge, and a member detachably connected to the container for normally holding the handle in vertical position.

26. A battery comprising a container, cells received in the container, a wedge insertable between the container and cells, a handle connected to the container for swinging movement and adapted to operate the wedge, and a member detachably connected to the container for normally holding the handle in raised position, said member having a recess for the reception of a portion of the handle.

27. A battery comprising a container, cells received in the container, a wedge insertable between the container and cells, a handle connected to the container for swinging movement and adapted to operate the wedge, and a member detachably connected to the container for normally holding the handle in raised position, said member having an extension adapted to be engaged for connecting or disconnecting the member to or from the container.

28. A battery comprising a container, cells received in the container, a wedge insertable between the container and cells, a handle connected to the container for swinging movement and adapted to operate the wedge, and a member detachably connected to the container for normally holding the handle in raised position, said member having a recess for receiving a portion of the handle and an extension adapted to be engaged for connecting or detaching the member to or from the container.

29. A battery comprising a container, cells received in the container, a wedge insertable between the container and cells, a handle connected to the container for swinging movement and adapted to operate the wedge, a guide carried by the container, and a member carried by the guide and adapted to engage the handle for normally holding the same in raised position.

30. A battery comprising a container, cells received in the container, a wedge insertable between the container and cells, a handle connected to the container for swinging movement and adapted to operate the wedge, a guide carried by the container, and a member removably carried by the guide and engageable with the handle for normally holding the handle in raised position.

31. A battery comprising a container, cells received in the container, a wedge insertable between the container and cells, a handle connected to the container for swinging movement and adapted to operate the wedge, a guide carried by the container, and a removable member carried by the guide and extending vertically to a position above the top of the container, said member normally engaging the handle to hold the same in raised position.

32. A battery comprising a container, cells received in the container, a wedge insertable between the container and cells, a handle connected to the container for swinging movement, and projections on the handle and normally received in recesses formed in the top of the container and engaging the wedge, said wedge being operated by the projections upon movement of the handle.

33. A battery comprising a container, readily removable and interchangeable cells received in the container, wedges adapted to be inserted between the container and cells, handles connected to the container for swinging movement, projections on the handles and engageable with the wedges for operating the same, guides carried by the container, and members detachably carried by the guides and adapted to engage the handles for normally holding them in raised position.

34. A battery comprising a container, readily removable and interchangeable cells received in the container, wedges adapted to be inserted between the container and cells, said wedges having flanges adapted to overlie the top of the container, handles connected to the container for swinging movement, projections on the handles and adapted to engage beneath the flanges on the wedges for moving the wedges with respect to the container and cells, guides carried by the container, and members carried by the guides and adapted to hold the handles in normally raised position, said members having recesses adapted to receive a portion of the handles.

35. A battery cell having a cover provided with a depression, a binding post extending through the bottom of the depression, a cap received around the binding post and over the top of the depression, and means carried by the binding post, and engaging the cap, for securing the same in position.

36. A battery cell having a cover provided with a depression, a binding post extending through the bottom of the depression and provided with vertically spaced shoulders, a packing washer received on the lowermost shoulder and engaging the bottom of the depression, a packing washer received on the uppermost shoulder, a cap received on the binding post and covering the top of the depression and engaging the packing ring on the uppermost shoulder, and means received on the binding post, and engaging the cap, for securing the cap in position.

37. A battery cell having a cover provided with a depression to receive a sealing compound, a binding post extending through the bottom of the depression and having vertically spaced shoulders, a packing washer received on the lowermost shoulder and engaging the bottom of the depression, a packing ring received on the uppermost shoulder, a cap received on the binding post for closing the depression, said cap having a recess in its underside for receiving the uppermost packing ring, and a nut received on the binding post and engaging the top of the cap for securing the same in position.

38. A battery cell having a cover provided with a filling opening, a cap for closing said opening provided with a vent opening, and a valve carried by the cap for controlling communication between the cell and vent opening.

39. A battery cell having a cover provided with a filling opening, a removable cap for said opening, said cap having a recess and a vent communicating with the recess, and a valve operable in the recess for controlling communication between the interior of the cell and the cap vent.

40. A battery cell having a cover provided with a filling opening, a removable cap for said opening, said cap having a recess extending from the lower surface and a vent opening leading from the recess to the exterior of the cap, a perforated closure for the inner end of the recess of the cap, and a valve operable in the recess, said valve normally closing the perforation of the recess closure.

41. A battery cell having a cover provided with a filling opening, a removable cap for closing the opening, said cap having a recess extending from its under surface and a vent opening extending from the recess to the exterior of the cap, a perforated closure plate for the end of the recess, and an inverted cup shaped valve operable in the recess between the top thereof and the closure plate, said valve normally closing the opening in the closure plate but when raised allowing communication through the closure plate and vent opening to the exterior of the cap.

42. A battery comprising a container having its inner walls beveled, a plurality of readily removable and interchangeable cells received in the container, each of said cells having a cover provided with a depression and a filling opening, a binding post extending through the bottom of the depression, a cap received on the binding post and adapted to close the depression, means engageable with the binding post for securing the cap in position, and a valved closure cap for the filling opening, wedges adapted for insertion between the container and cells, said wedges cooperating with the beveled walls of the container for securing the cells therein, handles connected to the container for swinging movement and adapted to engage the wedges for operating the same with respect to the container and cells, and means for normally holding the handles in raised position.

In testimony whereof I hereunto affix my signature in the presence of two witnesses.

AUGUST E. MELCHIOR.

Witnesses:
B. B. PEARSON,
M. HELLEN BRELLAHAN.